US012544648B2

(12) United States Patent
Yu et al.

(10) Patent No.: US 12,544,648 B2
(45) Date of Patent: Feb. 10, 2026

(54) SMART CHESS-LIKE GAME PIECE POSITIONING AND RECOGNITION SYSTEM

(71) Applicant: Yan Weng, Hangzhou (CN)

(72) Inventors: Fuxiang Yu, Hangzhou (CN); Yan Weng, Hangzhou (CN)

(73) Assignee: Yan Weng, Hangzhou (CN)

( * ) Notice: Subject to any disclaimer, the term of this patent is extended or adjusted under 35 U.S.C. 154(b) by 0 days.

(21) Appl. No.: 18/957,864

(22) Filed: Nov. 24, 2024

(65) Prior Publication Data

US 2025/0083030 A1 Mar. 13, 2025

Related U.S. Application Data

(63) Continuation of application No. PCT/CN2023/093439, filed on May 11, 2023.

(30) Foreign Application Priority Data

May 24, 2022 (CN) ........................ 202210569254.X

(51) Int. Cl.
*A63F 3/00* (2006.01)
*A63F 3/02* (2006.01)
(Continued)

(52) U.S. Cl.
CPC ...... *A63F 3/00694* (2013.01); *A63F 3/00643* (2013.01); *A63F 3/02* (2013.01);
(Continued)

(58) Field of Classification Search
CPC .......... A63F 13/21; A63F 13/335; A63F 3/02; A63F 3/00694; A63F 3/00643;
(Continued)

(56) References Cited

U.S. PATENT DOCUMENTS 7,051,945 B2 * 5/2006 Empedocles .......... H10D 30/43 257/14
8,602,857 B2 * 12/2013 Morichau-Beauchant ................. A63F 3/00643 463/9

(Continued)

FOREIGN PATENT DOCUMENTS

CN 105233492 A 1/2016
CN 105903181 A 8/2016

(Continued)

OTHER PUBLICATIONS

International Search Report in International application No. PCT/CN2023/093439, mailed on Jun. 23, 2023.

(Continued)

*Primary Examiner* — William H McCulloch, Jr.
(74) *Attorney, Agent, or Firm* — PV IP PC; Wei Te Chung

(57) ABSTRACT

A chess-like piece positioning and recognition system, including: an MCU, an RFID module, multi-channel analog switches, an electromagnet and communication signal switch unit, an electromagnetic drive unit, antennas, silicon steel blocks, and pieces. The MCU is used for communication with the RFID module, selecting channels of the multi-channel analog switches, and electromagnet and communication signal switch selection. The RFID module is used for reading information from the pieces. The multi-channel analog switches are used for group gating and intra-group channel gating of the RF channels. The electromagnet and communication signal switch unit is used for switching between the electromagnetic drive unit and the RF channels. The electromagnetic drive unit is used for driving an electromagnet. The antenna is used for sending and receiving signals from the pieces and also serves as the coil for the electromagnet. The silicon steel block is used as the core of
(Continued)

the electromagnet, which generates a magnetic attraction to the pieces after being magnetized.

12 Claims, 5 Drawing Sheets

(51) Int. Cl.
*A63F 9/24* (2006.01)
*A63F 13/21* (2014.01)
*A63F 13/335* (2014.01)

(52) U.S. Cl.
CPC ................ *A63F 9/24* (2013.01); *A63F 13/21* (2014.09); *A63F 13/335* (2014.09); *A63F 2003/00662* (2013.01); *A63F 2003/00665* (2013.01); *A63F 2009/2485* (2013.01); *A63F 2009/2489* (2013.01)

(58) Field of Classification Search
CPC ................ A63F 9/24; A63F 2009/2485; A63F 2009/2489; A63F 2003/00662; A63F 2003/00665; A63F 2003/00457
See application file for complete search history.

(56) References Cited

U.S. PATENT DOCUMENTS

| | | | | |
|---|---|---|---|---|
| 8,974,295 | B2 * | 3/2015 | Maharbiz | A63F 3/00214 273/237 |
| 9,114,940 | B2 * | 8/2015 | Kraegeloh | A63F 3/00 |
| 9,446,319 | B2 * | 9/2016 | Barney | A63F 13/25 |
| 9,656,814 | B2 * | 5/2017 | Kraegeloh | A63F 3/00697 |
| 9,704,003 | B1 * | 7/2017 | Anderson | G06K 7/10356 |
| 10,088,925 | B2 * | 10/2018 | Duteil | A63F 13/2145 |
| 10,598,811 | B2 * | 3/2020 | McClard | G01V 3/38 |
| 10,857,450 | B1 * | 12/2020 | Aman | A63F 13/213 |
| 11,369,862 | B2 * | 6/2022 | Socorregut | A63F 9/24 |
| 12,157,064 | B1 * | 12/2024 | Aman | A63F 3/00214 |
| 2015/0242018 | A1 * | 8/2015 | Shi | G10H 1/0066 345/174 |
| 2016/0004894 | A1 * | 1/2016 | Tanikawa | G06K 7/10227 340/10.51 |
| 2016/0334906 | A1 * | 11/2016 | Shi | A63F 13/95 |
| 2017/0120140 | A1 * | 5/2017 | Lee | A63F 3/00006 |
| 2018/0111046 | A1 * | 4/2018 | Roberts | A63F 13/95 |
| 2018/0207518 | A1 * | 7/2018 | McClard | G01V 3/38 |
| 2019/0022517 | A1 * | 1/2019 | Socorregut | A63F 3/00643 |
| 2025/0065216 | A1 * | 2/2025 | Yu | A63F 3/00697 |
| 2025/0065217 | A1 * | 2/2025 | Weng | A63F 3/00643 |
| 2025/0083030 | A1 * | 3/2025 | Yu | G06K 7/10 |

FOREIGN PATENT DOCUMENTS

| | | | |
|---|---|---|---|
| CN | 111450513 | A | 7/2020 |
| CN | 113457114 | A | 10/2021 |
| CN | 216295178 | U | 4/2022 |
| WO | 2018174754 | A1 | 9/2018 |

OTHER PUBLICATIONS

Written Opinion of the International Search Authority in International application No. PCT/CN2023/093439, mailed on Jun. 23, 2023.

Chinese Office Action issued in corresponding Chinese Patent Application No. 202210569254.X dated Jun. 3, 2024, 12 pages.

* cited by examiner

| Enable | A | B | C | group gating N | Channel |
|---|---|---|---|---|---|
| Yes | 0 | 0 | 0 | Yes | 1 |
| Yes | 0 | 0 | 1 | Yes | 2 |
| Yes | 0 | 1 | 0 | Yes | 3 |
| Yes | 0 | 1 | 1 | Yes | 4 |
| Yes | 1 | 0 | 0 | Yes | 5 |
| Yes | 1 | 0 | 1 | Yes | 6 |
| Yes | 1 | 1 | 0 | Yes | 7 |
| Yes | 1 | 1 | 1 | Yes | 8 |
| No | X | X | X | No | X |

| Enable | A | B | C | group gating |
|---|---|---|---|---|
| Yes | 0 | 0 | 0 | 1 |
| Yes | 0 | 0 | 1 | 2 |
| Yes | 0 | 1 | 0 | 3 |
| Yes | 0 | 1 | 1 | 4 |
| Yes | 1 | 0 | 0 | 5 |
| Yes | 1 | 0 | 1 | 6 |
| Yes | 1 | 1 | 0 | 7 |
| Yes | 1 | 1 | 1 | 8 |
| No | X | X | X | X |

FIG. 6

SMART CHESS-LIKE GAME PIECE POSITIONING AND RECOGNITION SYSTEM

CROSS-REFERENCE TO RELATED APPLICATION

The present application is a U.S. continuation of International Application No. PCT/CN2023/093439 filed May 11, 2023, which claims priority to Chinese Patent Application No. 2 02210569254.X filed with China National Intellectual Property Administration on May 24, 2022, the contents of the above applications are incorporated herein by reference in their entireties.

TECHNICAL FIELD

The present invention relates to chess-like game pieces, and more specifically, to a system for positioning and recognizing chess-like game pieces.

BACKGROUND

With the development of technology in the internet age and the popularization of artificial intelligence, the emergence of an increasing number of smart terminal devices has led to a continuous market emergence of smart chess-like game pieces (hereinafter "pieces" or "piece"). It is well known that during a game of chess, pieces are placed on the chess-like game board (hereinafter "board"). To achieve positioning and recognition of pieces, a system capable of determining the positions of the pieces on the board is required.

Radio Frequency Identification (RFID) antennas are an important component of RFID card recognition circuits and are widely used in various smart terminal devices. As a standalone recognition application, it is very common and technologically mature. However, for multiple objects that need to be recognized, a single RFID antenna circuit cannot meet the application requirements, especially for the positioning and recognition of a large number of pieces on a board, which is even more difficult to achieve.

Accordingly, there is a need in this field for an improved piece positioning and recognition system.

SUMMARY

This summary is provided to introduce some concepts in a simplified form, which will be further described in the following detail description. This summary is not intended to identify the key features or necessary features of the subject matter to be protected, nor is it intended to help determine the scope of the subject matter to be protected.

In view of the deficiencies in the existing technology described above, the purpose of the present invention is to provide a piece positioning and recognition system for the positioning and recognition of pieces on a board, which can effectively locate and recognize the positions of the pieces and fix the pieces so that they do not drift on the board due to vibrations or inclinations.

According to the present invention, a piece positioning and recognition system is provided, which includes: a microcontroller unit; a Radio Frequency Identification (RFID) module connected to the microcontroller unit, having at least a first port and a second port; a multi-channel analog switch connected to the microcontroller unit and the RFID module; an electromagnet and communication signal switch unit connected to the multi-channel analog switch; an electromagnetic drive unit connected to the electromagnet and communication signal switch unit; antennas connected to the electromagnet and communication signal switch unit; silicon steel blocks; and pieces, wherein the microcontroller unit is configured to select a channel of the multi-channel analog switch and control the electromagnet and communication signal switch unit to select a corresponding Radio Frequency (RF) antenna path; wherein the RFID module is configured to read piece information transmitted via the RF antenna path from the antenna; wherein the multi-channel analog switch is configured for group gating and intra-group channel gating to select a channel corresponding to the RF antenna path; wherein the electromagnet and communication signal switch unit is configured to switch between the electromagnetic drive unit and the RF antenna path; wherein the electromagnetic drive unit is configured to drive an electromagnet; wherein the antennas are configured for transmitting and receiving signals of the pieces and configured for a coil of the electromagnet; wherein the silicon steel blocks are configured as a core of the electromagnet, generating a magnetic attraction to the pieces after being magnetized; wherein the piece includes a piece structure, a built-in permanent magnet, and a coil and a chip for a recognition tag.

In one embodiment, the RFID module may include an RFID chip, and an RF antenna path formed by the RFID chip reads piece information in a time-sharing multiplexing manner.

In one embodiment, the RFID module may include an RFID chip matrix composed of multiple RFID chips, the RFID chip matrix capable of reading multiple piece information synchronously via different RF antenna paths.

In one embodiment, the multi-channel analog switch may include a multi-channel output analog switch connected to the first port of the RFID module and a multi-channel input analog switch connected to the second port of the RFID module, the multi-channel input analog switch connected to the antennas in a form of grouped loop circuits, where antennas within each group in the grouped loop circuits connect to the multi-channel input analog switch in a single-bus loop circuit form.

In one embodiment, the multi-channel analog switch may include a multi-channel output analog switch connected to the first port of the RFID module, the second port of the RFID module connected to the antennas in a form of a non-grouped bus loop circuit, with all antennas directly connected to a single point at the second port of the RFID module.

In one embodiment, the antenna may be made by winding enameled wire or conductor wire and is installed and fixed onto an object or directly fabricated on a printed circuit board.

In one embodiment, the silicon steel block may be fixed at the center of the coil antenna and made of a metal with controllable magnetism, low remanence, and high magnetic permeability (e.g., iron, steel, etc.).

In one embodiment, the channels of the multi-channel analog switch may be selected using a decoder. The decoder may be a 3-8 decoder or a 4-16 decoder.

In one embodiment, the RF antenna path may be a path from the first port of the RFID module, through the selected channel of the multi-channel analog switch, the corresponding electromagnet and communication signal switch unit, the corresponding antenna, and back to the second port of the RFID module, the impedance of the RF antenna path being no greater than 10 ohms.

In one embodiment, a form of grouped loop circuits is selected under a condition that a total capacitance of the RF antenna path is greater than 1000 pF, and a form of a bus loop circuit is selected under a condition that the total capacitance of the RF antenna path is no greater than 1000 pF.

In one embodiment, the electromagnet and communication signal switch unit may default to an electromagnetic conductive state, disconnecting the electromagnetic drive unit only when a signal is applied.

The system according to the present invention features simplicity, effectiveness, and low cost. It can rapidly recognize each object among multiple objects to be recognized. The application forms are diverse; according to the needs of the application scenario, pieces can be arranged in a planar, layered, or polyhedral pattern, and can also be a combination of planar, layered, and polyhedral arrangements. This makes the application more flexible for the intelligent positioning and recognition of pieces on a spatial polyhedral board.

By reading the following detailed description and referring to the associated drawings, these and other features and advantages will become apparent. It should be understood that the foregoing general description and the following detailed description are explanatory and do not limit the scope of the claimed aspects.

BRIEF DESCRIPTION OF THE DRAWINGS

To understand in detail the manner in which the above features of the invention are used, a more specific description of the content briefly outlined above can be made with reference to the embodiments shown in the drawings. However, it should be noted that the drawings only show some typical aspects of the invention and should not be considered to limit its scope, as the description allows for other equivalent and effective aspects.

FIG. 6 illustrates a diagram showing gating of the analog switch for selecting a specific group according to an embodiment of the present invention.

DETAILED DESCRIPTION

The following describes the present invention in detail with reference to the drawings, and the features of the present invention will be further revealed in the following description.

As mentioned above, for multiple objects that need to be recognized, a single RFID antenna circuit cannot meet the application requirements, especially for the positioning and recognition of a large number of pieces on a board, which is even more difficult to achieve. Therefore, the present invention provides an improved piece positioning and recognition system, which uses an innovative design application scheme, solves the problem of multi-target recognition with a simple circuit, and reduces costs. It also makes the application scene more extensive and flexible.

Figure 1:
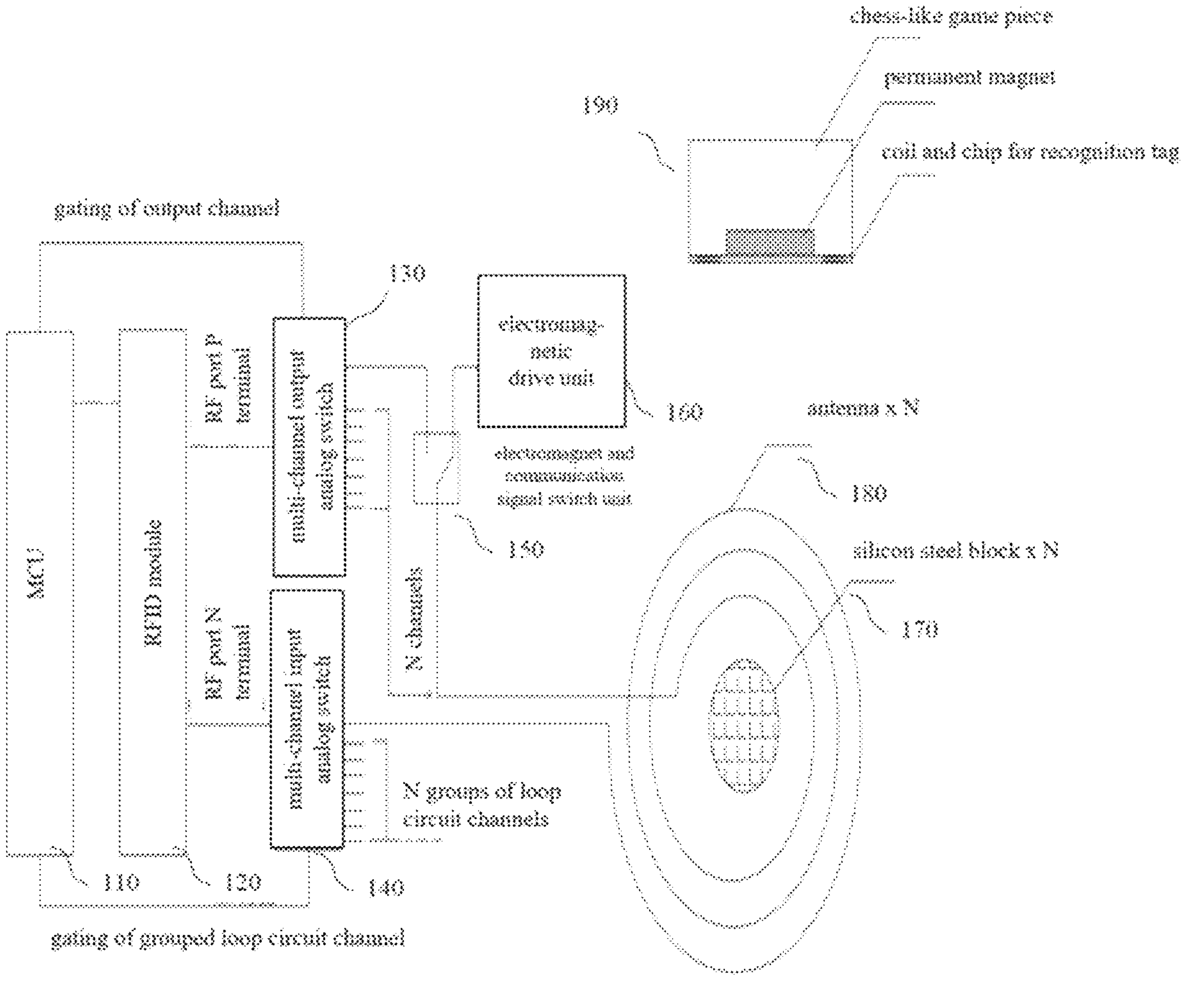
FIG. 1 illustrates a schematic diagram of a piece positioning and recognition system according to an embodiment of the present invention.

FIG. 1 illustrates a schematic diagram of a piece positioning and recognition system 100 according to an embodiment of the present invention. As shown in FIG. 1, the piece positioning and recognition system 100 may include the following components: a microcontroller unit (MCU) 110, an RFID module 120, multi-channel analog switches (e.g., a multi-channel output analog switch 130 and a multi-channel input analog switch 140 in the embodiment shown in FIG. 1), an electromagnet and communication signal switch unit 150, an electromagnetic drive unit 160, silicon steel blocks 170, antennas 180, and pieces 190. In one embodiment, the MCU 110, RFID module 120, multi-channel analog switches, electromagnet and communication signal switch unit 150, electromagnetic drive unit 160, silicon steel blocks 170, and antennas 180 can be housed within a board. The letter "N" in FIG. 1 can represent the number of squares on the board (e.g., for a chessboard with 64 squares, N can be equal to 64).

The MCU 110 can be implemented by a microcontroller, a microprocessor, a Field Programmable Gate Array (FPGA), an Application-Specific Integrated Circuit (ASIC), or any other suitable control circuit. In one embodiment, the MCU 110 can communicate with the RFID module 120 to send signals to and/or receive signals from the RFID module 120. For example, the MCU 110 can send a request signal to the RFID module 120 to request the RFID module 120 to transmit a radio frequency signal with a specific frequency. In addition, the MCU 110 can also receive signals containing piece information for recognizing and positioning the pieces from the RFID module 120. In one embodiment, the MCU 110 can send a gating signal to the multi-channel analog switches (e.g., multi-channel output analog switch 130 and multi-channel input analog switch 140) to select the corresponding channel for forming a specific Radio Frequency (RF) antenna path. In the present application, the RF antenna path can refer to a path from the first port of the RFID module, through the selected channel of the multi-channel analog switches, the corresponding electromagnet and communication signal switch unit, the corresponding antenna, and back to the second port of the RFID module. For example, for chess, there can be 64 RF antenna paths, each square being associated with an RF antenna path. The gating process of the multi-channel analog switch channels will be further described in detail below with reference to FIGS. 3-6.

Figure 2:
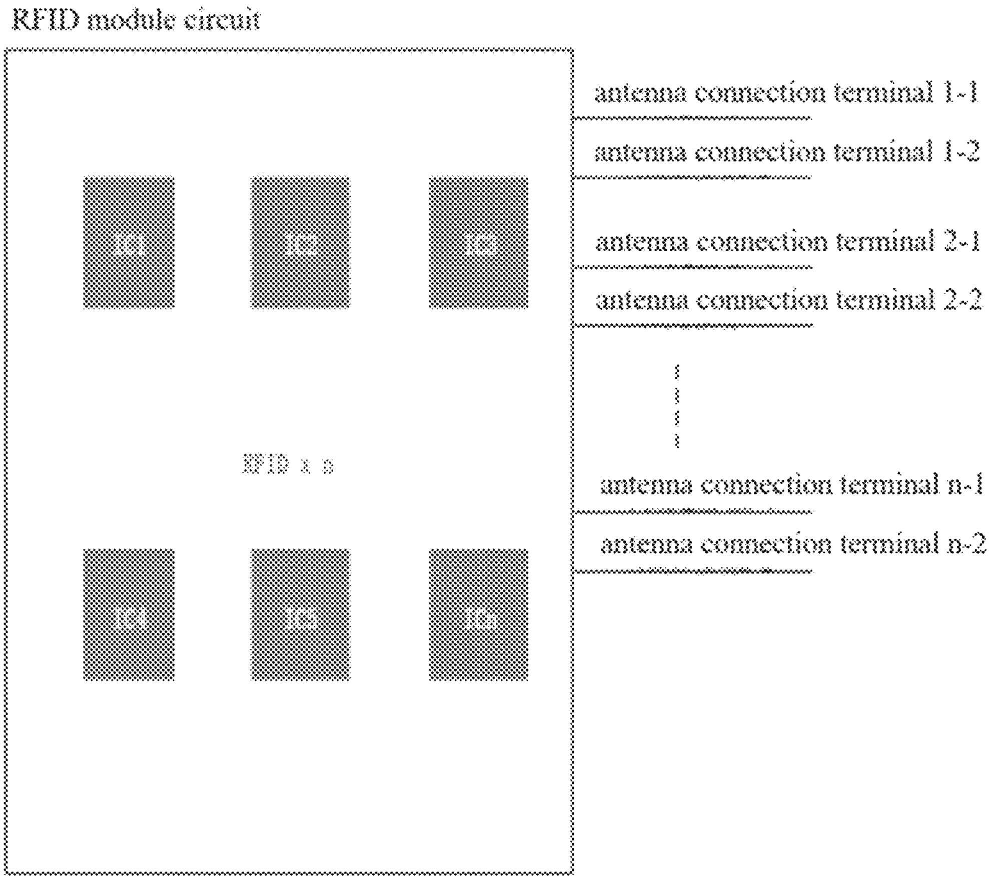
FIG. 2 illustrates a diagram of a structure of an RFID module according to an embodiment of the present invention.

The RFID module 120 can be configured to transmit radio frequency signals to the piece on the corresponding square via the selected RF antenna path and read the piece information transmitted via the selected RF antenna path from the corresponding antenna. In one embodiment, the RFID module 120 can include at least a first port and a second port (e.g., RF port P terminal and RF port N terminal in FIG. 1). In one embodiment, the RFID module 120 can include an RFID chip matrix composed of multiple RFID chips, the RFID chip matrix capable of reading multiple piece information synchronously via different RF antenna paths. See FIG. 2, which illustrates a diagram of a structure of an RFID module 200 according to an embodiment of the present invention. The RFID module 200 can include multiple (e.g., n) RFID IC chips, which can be combined into an RFID IC chip matrix. Especially when there is a need for multiple RF antenna paths to read and recognize targets (e.g., multiple pieces) synchronously, if several antennas require synchronous reading, then combine several RFID IC chips to form several antenna outputs. In another embodiment, the RFID module 120 can include only one RFID IC chip, and an RF antenna path formed by the RFID chip can read piece information asynchronously in a time-sharing multiplexing manner.

The electromagnet and communication signal switch unit 150 can be configured for switching between the electromagnetic drive unit 160 and the RF antenna path(s). In one embodiment, the electromagnet and communication signal switch unit 150 can be implemented by a 2-way selector switch (e.g., a single-pole double-throw switch), a.k.a. 2:1 MUX. In the example of chess, the number of electromagnet and communication signal switch units 150 can be 64, each corresponding to one RF antenna path. In one embodiment, the electromagnet and communication signal switch unit 150 can default to an electromagnetic conductive state (i.e., a state in which the electromagnetic drive unit 160 is connected to the antenna 180). Only when the channel of the multi-channel analog switch connected to the electromagnet and communication signal switch unit 150 is selected (e.g., when a signal is received from the MCU or RFID module), the electromagnet and communication signal switch unit 150 disconnects from the electromagnetic drive unit 160 and connects the selected channel of the multi-channel analog switch to the corresponding antenna 180.

As used herein, the term "electromagnet and communication signal switch" refers to the switching of the coil to either the electromagnetic drive circuit or the RFID communication signal path.

The electromagnetic drive unit 160 can be configured to drive an electromagnet to generate a magnetic attraction to the piece, thereby fixing the piece so that it does not drift on the board due to vibrations or inclinations.

The silicon steel block 170 can be configured for a core of the electromagnet, generating a magnetic attraction to the piece after being magnetized. In one embodiment, the silicon steel block 170 can be fixed at the center of the antenna and made of a metal with controllable magnetism, low remanence, and high magnetic permeability (e.g., iron, steel, etc.).

The antenna 180 can be made by winding enameled wire or conductor wire to form individual antennas, which can be installed and fixed onto an object, or directly fabricated on a PCB board, forming a planar or spatial. Due to the presence of the permanent magnet, when the piece 190 is subjected to the magnetic attraction of the electromagnet, the piece 190 can be adsorbed onto the corresponding square without drifting. In addition, the chip for the recognition tag can contain information about the piece 190 (e.g., the ID identifier of the piece, the type of the piece (such as king, queen, knight, pawn, etc.), the weight of the piece, etc.). When a radio frequency signal from the RFID module 120 is received, the coil for the recognition tag can respond to the radio frequency signal and send the information contained in the chip about the piece 190 to the RFID module 120. Based on this information, the MCU 110 can quickly recognize the type of the piece and locate the position of the piece on the board.

The multi-channel analog switch can be configured for group gating (e.g., via the multi-channel input analog switch 140) and intra-group channel gating (e.g., via the multi-channel output analog switch 130) to select a channel corresponding to the RF antenna path. In other words, the multi-channel analog switch is mainly used to select which antenna 180 the RFID module 120 should be connected to in order to form a specific RF antenna path (i.e., which square to attempt to transmit RF signals to, in order to obtain information from the piece located on that square, thereby recognizing and positioning the piece). In one embodiment, the gating of the multi-channel analog switch can be implemented by combining group gating with intra-group channel gating. For example, all RF antenna paths can first be divided into N groups, with each group containing the same number of RF antenna paths. For the example of chess, all 64 RF antenna paths can first be divided into 8 groups, with each group containing 8 RF antenna paths. Gating for the group (i.e., which group to select) and gating for the intra-group channel (i.e., which channel within the group to select) can be implemented using a decoder (e.g., a 3-8 decoder or a 4-16 decoder) and an enable signal.

Figures 4, 5:
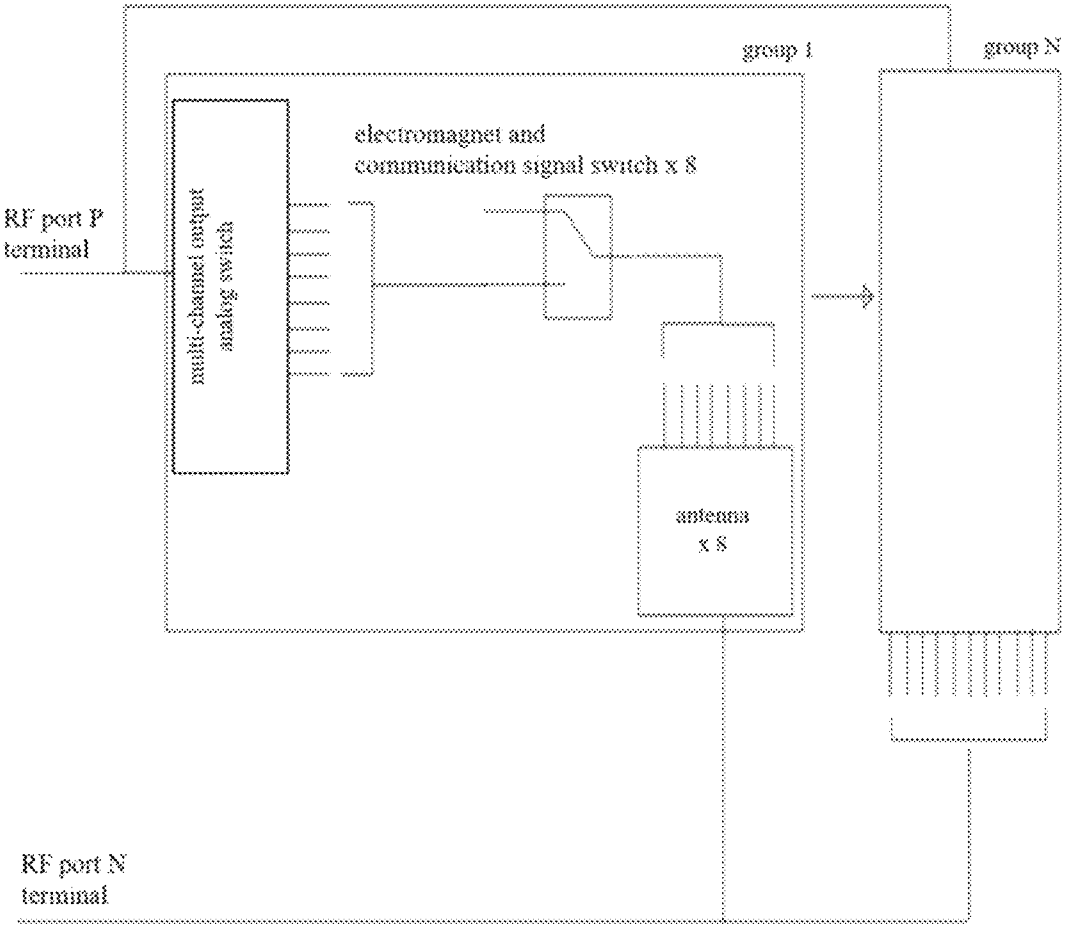
FIG. 4 illustrates a schematic diagram of a connection using a single-bus loop circuit between the multi-channel analog switch and the antenna according to an embodiment of the present invention.
FIG. 5 illustrates a diagram showing gating of the analog switch for selecting a specific channel within a group according to an embodiment of the present invention.

FIG. 5 illustrates a diagram 500 showing gating of the analog switch for selecting a specific channel within a group according to an embodiment of the present invention. FIG. 6 illustrates a diagram 600 showing gating of the analog switch for selecting a specific group according to an embodiment of the present invention. As shown in FIG. 6, a 3-8 decoder and an enable signal are used to select a specific group. For example, when the enable signal is "Yes" and the gating signal is "000", group 1 is selected; when the enable signal is "Yes" and the gating signal is "001", group 2 is selected; when the enable signal is "Yes" and the gating signal is "010", group 3 is selected; when the enable signal is "Yes" and the gating signal is "011", group 4 is selected; when the enable signal is "Yes" and the gating signal is "100", group 5 is selected; when the enable signal is "Yes" and the gating signal is "101", group 6 is selected; when the enable signal is "Yes" and the gating signal is "110", group 7 is selected; when the enable signal is "Yes" and the gating signal is "111", group 8 is selected. Thereby, a specific group can be selected. Additionally, as shown in FIG. 5, a 3-8 decoder and an enable signal are used to select a specific channel within a group. For example, when the enable signal is "Yes" and the gating signal is "000", channel 1 is selected; when the enable signal is "Yes" and the gating signal is "001", channel 2 is selected; when the enable signal is "Yes" and the gating signal is "010", channel 3 is selected; when the enable signal is "Yes" and the gating signal is "011", channel 4 is selected; when the enable signal is "Yes" and the gating signal is "100", channel 5 is selected; when the enable signal is "Yes" and the gating signal is "101", channel 6 is selected; when the enable signal is "Yes" and the gating signal is "110", channel 7 is selected; when the enable signal is "Yes" and the gating signal is "111", channel 8 is selected. Thereby, a specific channel within a group can be selected. By combining the group gating shown in FIG. 6 and the intra-group channel gating shown in FIG. 5, a specific one of all RF antenna paths can be selected.

According to the present invention, the connection method between the multi-channel analog switch and the antenna can be in a form of grouped loop circuits or in a form of a non-grouped bus loop circuit.

Figure 3:
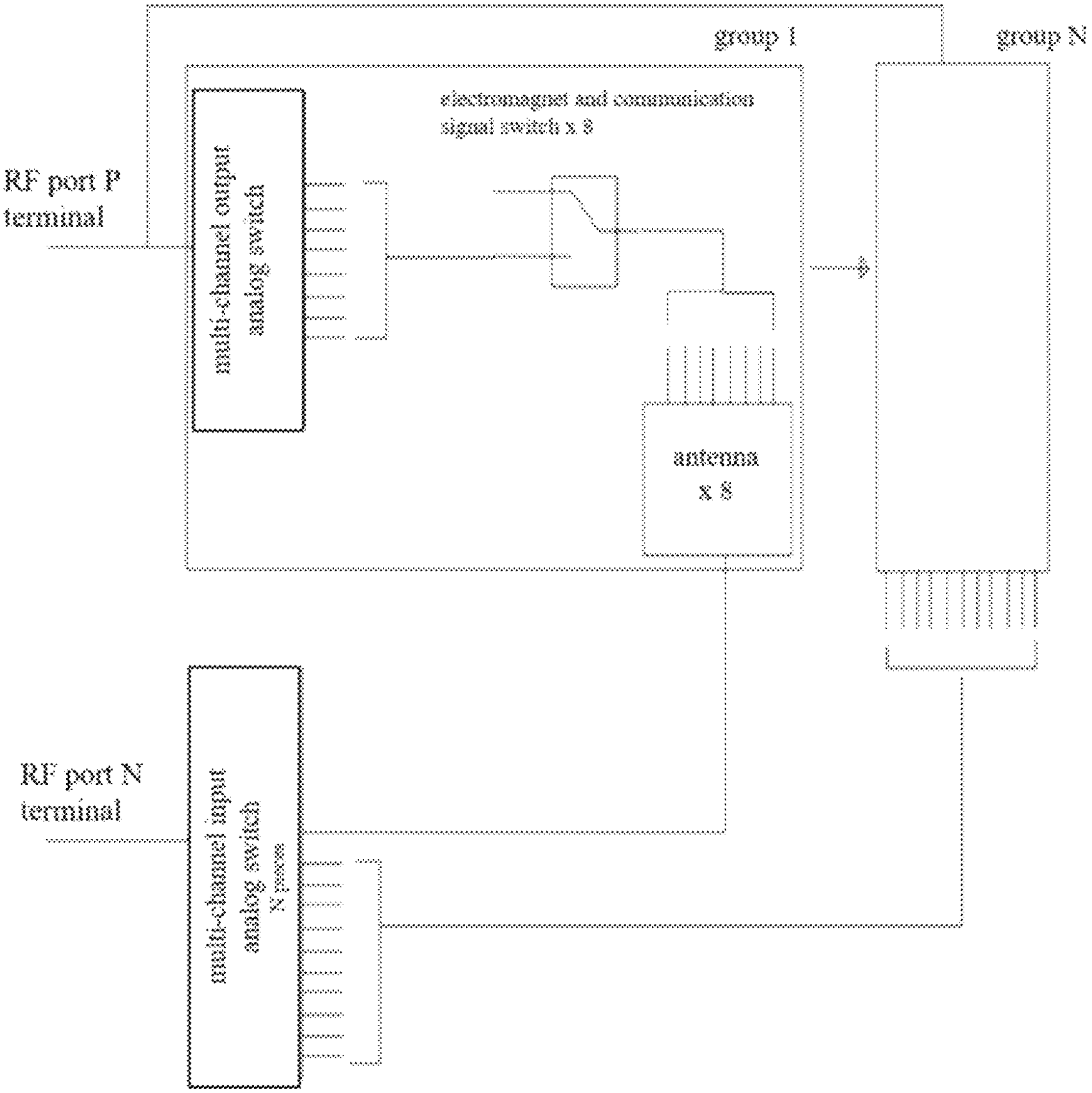
FIG. 3 illustrates a schematic diagram of a connection using grouped loop circuits between the multi-channel analog switch and the antenna according to an embodiment of the present invention.

FIG. 3 illustrates a schematic diagram 300 of a connection using grouped loop circuits between the multi-channel analog switch and the antenna according to an embodiment of the present invention. As shown in FIG. 3, the multi-channel analog switch can include a multi-channel output analog switch connected to the first port of the RFID module (e.g., RF port P terminal) and a multi-channel input analog switch connected to the second port of the RFID module (e.g., RF port N terminal), the multi-channel input analog switch connected to the antennas in a form of grouped loop circuits, where antennas within each group in the grouped loop circuits connect to the multi-channel input analog switch in a single-bus loop circuit form. Each grouped loop circuit goes to the RF port N terminal through one channel loop circuit of the multi-channel input analog switch. Since the RF port P terminal and N terminal are differential signals, the P terminal and N terminal are interchangeable.

FIG. 4 illustrates a schematic diagram 400 of a connection using a single-bus loop circuit between the multi-channel analog switch and the antenna according to an embodiment of the present invention. As shown in FIG. 4, the multi-channel analog switch can include a multi-channel output analog switch connected to the first port of the RFID module (e.g., RF port P terminal), and the second port of the RFID module (e.g., RF port N terminal) connected to the antennas in a form of a non-grouped bus loop circuit, with all antennas directly connected to a single point at the second port of the RFID module (e.g., RF port N terminal). Thereby, there is no need for a multi-channel input analog switch as shown in FIG. 3.

According to the present invention, the RF signal, through the multi-channel output analog switch, electromagnet and communication signal switch unit, multi-channel input analog switch, or single bus, must have an impedance not greater than 10 ohms and a total capacitance of the input and output loop circuit not greater than 1000 pF in the entire path to ensure correct transmission and reception of the RF signal. The form of grouped loop circuits is selected when the total size of the input and output capacitance of the path is greater than 1000 pF, and the form of the bus loop circuit is selected when it is less than 1000 pF, thereby reducing the total capacitance of the input and output loop circuit.

The above has given a detailed description of the various components of the piece positioning and recognition system of the present invention. The following further explains the operation method of the piece positioning and recognition system of the present invention, taking chess as an example. It should be noted that this example is illustrative and not limiting. The present invention is not limited to chess but can be applied to various other types of board games.

As is well known, chess has 64 squares and 32 pieces. Each piece can be placed on a square. Therefore, in order to recognize the position of each piece on the board, the piece positioning and recognition system can have a total of 64 RF antenna paths, each associated with a square. The MCU can send gating signals to the multi-channel analog switch in a specific order to select a specific antenna to connect the RFID module to, thereby gating specific RF antenna paths. This gating process can be implemented using a decoder, as described with reference to FIGS. 5 and 6. After the gating is completed, the MCU communicates with the RFID module through a data transceiver transmission line, and the RFID module transmits an RF signal to the corresponding square via the selected RF antenna path. When the piece on the square receives the RF signal, the piece information (e.g., piece ID identifier, type, weight, etc.) stored in the RF recognition tag chip of the piece can be read by the RFID module via that RF antenna path. The RFID module converts the signal received from the antenna into a digital signal and interacts with the MCU. The MCU quickly recognizes and locates the position of the piece based on this digital signal. By repeating the above process, the position of each piece can be quickly recognized and positioned.

In the description of the present invention, it is important to understand that the terms “first,” “second,” “third,” etc., are used for descriptive purposes only and should not be understood to indicate or imply relative importance.

The scope of the present disclosure can cover a variety of chess games. In other words, the present disclosure can be applied to international chess, Chinese chess, Go, Japanese Shogi, checkers, military chess, Gomoku, international draughts, Ludo, and many other types of chess games. Accordingly, the design of the board can also be adjusted according to these different chess games to accommodate their unique board layouts and rules. For example, the Chinese chessboard has a specific river boundary and a Sudoku layout, the Go board consists of a 19×19 grid of intersections, and the checkers board includes squares of different colors, and so on so forth. The present disclosure can flexibly adapt to these specific board layouts, whether traditional or modern, thereby providing support and enhancement for various types of chess games.

Although the various aspects of the present invention have been described with reference to the drawings so far, the aforementioned systems and components are exemplary, and the scope of the present invention is not limited to these aspects but is only limited by the appended claims and their equivalents. Various components may be omitted or replaced with equivalent components. In addition, the described steps may be implemented in a different order than described in the present invention. Moreover, various components can be combined in various ways. It is also important to note that with the development of technology, many of the described components can be replaced by equivalent components that appear later. Various modifications to the disclosure will be apparent to those skilled in the art, and the universal principles defined in this disclosure can be applied to other modifications without departing from the scope of the disclosure. Therefore, the disclosure is not limited to the examples and designs described herein but should be granted the broadest scope consistent with the principles and novel features disclosed herein.

What is claimed is:

1. A piece positioning and recognition system, comprising:

a microcontroller unit;

a Radio Frequency Identification (RFID) module connected to the microcontroller unit, having at least a first port and a second port;

a multi-channel analog switch connected to the microcontroller unit and the RFID module;

an electromagnet and communication signal switch unit connected to the multi-channel analog switch;

an electromagnetic drive unit connected to the electromagnet and communication signal switch unit;

antennas connected to the electromagnet and communication signal switch unit;

silicon steel blocks; and pieces, wherein the microcontroller unit is configured to select a channel of the multi-channel analog switch and control the electromagnet and communication signal switch unit to select a corresponding Radio Frequency (RF) antenna path;

wherein the RFID module is configured to read piece information transmitted via the RF antenna path from the antenna;

wherein the multi-channel analog switch is configured for group gating and intra-group channel gating to select a channel corresponding to the RF antenna path;

wherein the electromagnet and communication signal switch unit is configured to switch between the electromagnetic drive unit and the RF antenna path;

wherein the electromagnetic drive unit is configured to drive an electromagnet;

wherein the antennas are configured for transmitting and receiving signals of the pieces and configured for a coil of the electromagnet;

wherein the silicon steel blocks are configured as a core of the electromagnet, generating a magnetic attraction to the pieces after being magnetized;

wherein the piece includes a piece structure, a built-in permanent magnet, and a coil and a chip for a recognition tag.

2. The system as claimed in claim 1, wherein the RFID module includes an RFID chip, and an RF antenna path formed by the RFID chip reads piece information in a time-sharing multiplexing manner.

3. The system as claimed in claim 1, wherein the RFID module includes an RFID chip matrix composed of multiple RFID chips, the RFID chip matrix capable of reading multiple piece information synchronously via different RF antenna paths.

4. The system as claimed in claim 1, wherein the multi-channel analog switch includes a multi-channel output analog switch connected to the first port of the RFID module and a multi-channel input analog switch connected to the second port of the RFID module, the multi-channel input analog switch connected to the antennas in a form of grouped loop circuits, where antennas within each group in the grouped loop circuits connect to the multi-channel input analog switch in a single-bus loop circuit form.

5. The system as claimed in claim 1, wherein the multi-channel analog switch includes a multi-channel output analog switch connected to the first port of the RFID module, the second port of the RFID module connected to the antennas in a form of a non-grouped bus loop circuit, with all antennas directly connected to a single point at the second port of the RFID module.

6. The system as claimed in claim 1, wherein the antenna is made by winding enameled wire or conductor wire and is installed and fixed onto an object or directly fabricated on a printed circuit board.

7. The system as claimed in claim 1, wherein the silicon steel block is fixed at the center of the coil antenna and made of a metal with controllable magnetism, low remanence, and high magnetic permeability.

8. The system as claimed in claim 1, wherein the channels of the multi-channel analog switch are selected using a decoder.

9. The system as claimed in claim 8, wherein the decoder is a 3-8 decoder or a 4-16 decoder.

10. The system as claimed in claim 1, wherein the RF antenna path is a path from the first port of the RFID module, through the selected channel of the multi-channel analog switch, the corresponding electromagnet and communication signal switch unit, the corresponding antenna, and back to the second port of the RFID module, the impedance of the RF antenna path being no greater than 10 ohms.

11. The system as claimed in claim 10, wherein a form of grouped loop circuits is selected under a condition that a total capacitance of the RF antenna path is greater than 1000 pF, and a form of a bus loop circuit is selected under a condition that the total capacitance of the RF antenna path is no greater than 1000 pF.

12. The system as claimed in claim 1, wherein the electromagnet and communication signal switch unit defaults to an electromagnetic conductive state.

* * * * *